United States Patent [19]

Miller

[11] Patent Number: 5,165,173
[45] Date of Patent: Nov. 24, 1992

[54] JIGSAW

[75] Inventor: Anne Miller, Cambridge, England

[73] Assignee: Robert Bosch GmbH, Stuttgart, Fed. Rep. of Germany

[21] Appl. No.: 573,192

[22] PCT Filed: Mar. 15, 1988

[86] PCT No.: PCT/EP88/00201
§ 371 Date: Sep. 7, 1990
§ 102(e) Date: Sep. 7, 1990

[87] PCT Pub. No.: WO89/08524
PCT Pub. Date: Sep. 21, 1989

[51] Int. Cl.$^5$ .............................................. B23D 49/04
[52] U.S. Cl. ........................................ 30/392; 30/394
[58] Field of Search .................................. 30/392–394; 279/19.5, 19.6, 41 R

[56] References Cited

U.S. PATENT DOCUMENTS 4,528,753 7/1985 Kuhlmann et al. ................... 30/392

Primary Examiner—Douglas D. Watts
Attorney, Agent, or Firm—Michael J. Striker

[57] ABSTRACT

A jigsaw blade (4) having diametrically opposed bayonet lugs (10) is retained within a bayonet fitting (6) provided on the end of a jigsaw drive shaft (3) by a locking device, which can be moved to permit removal of blade without the use of a separate tool. In one embodiment the locking device comprises a locking member (13) which engages the upper end (11) of the blade and is biased towards the blade by a spring (14). A tension member (18) is connected to the locking member (13) and to a manually operable tensioning device, whereby the locking member (13) may be lifted to compress the spring (14) until lugs (17) on the locking member (13) are clear of entry slots (6) of the bayonet fitting. The blade (4) may then be rotated to align the lugs (10) with the entry slots (8), and the blade removed. In an alternative embodiment, the locking member is a screw which engages the upper end (11) of the blade, and is rotatable by a screw rotating member with which it is in permanent sliding engagement. The screw rotating member is rotatable by a manually operated lever connected to it by a torque limiter.

7 Claims, 6 Drawing Sheets

FIG. 1
FIG. 1A
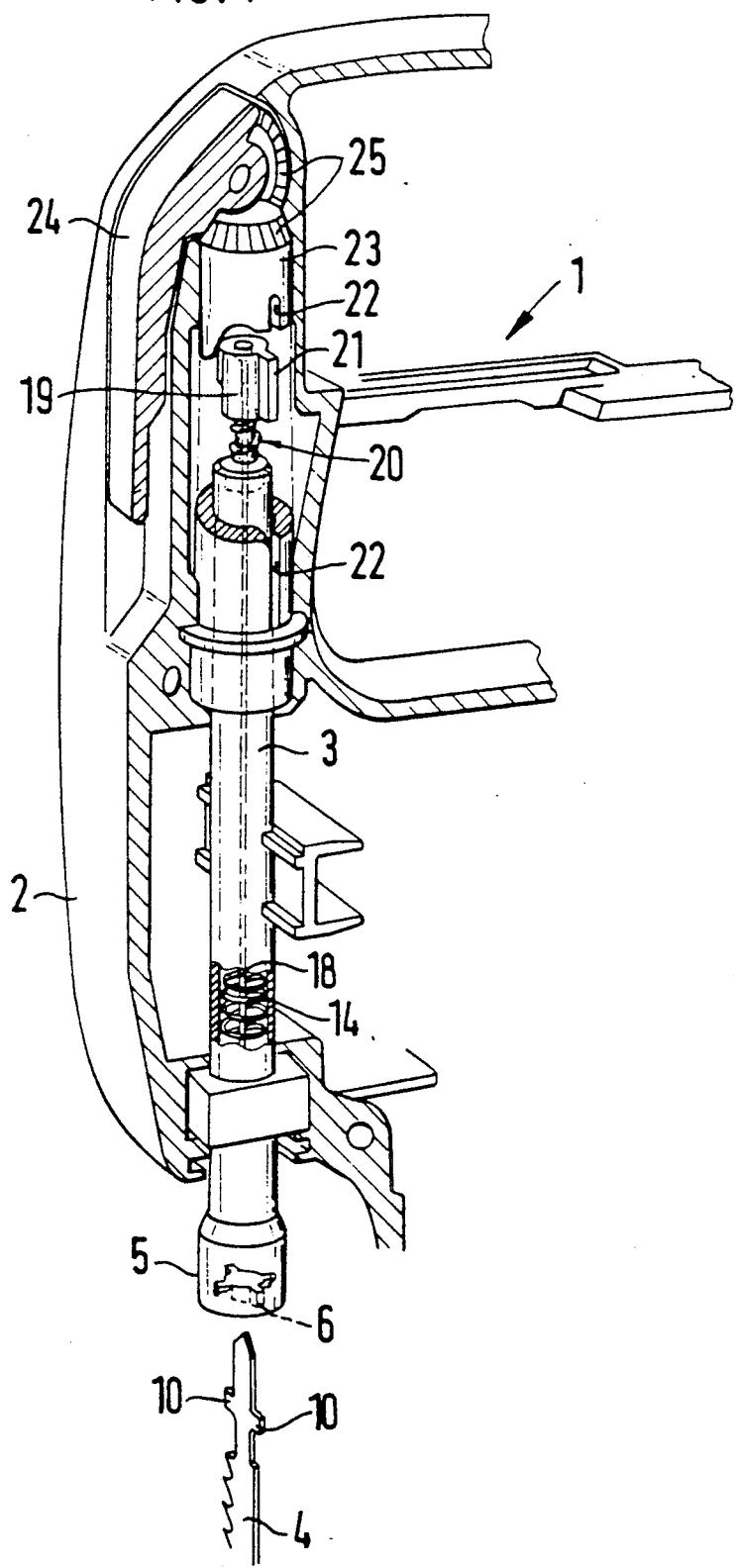
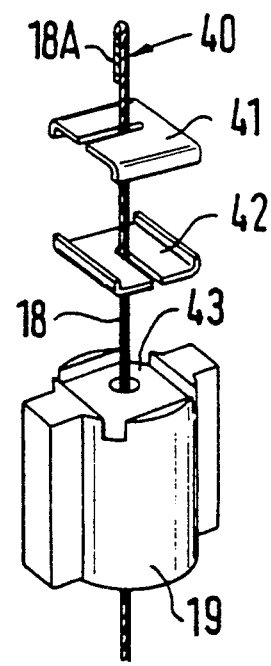

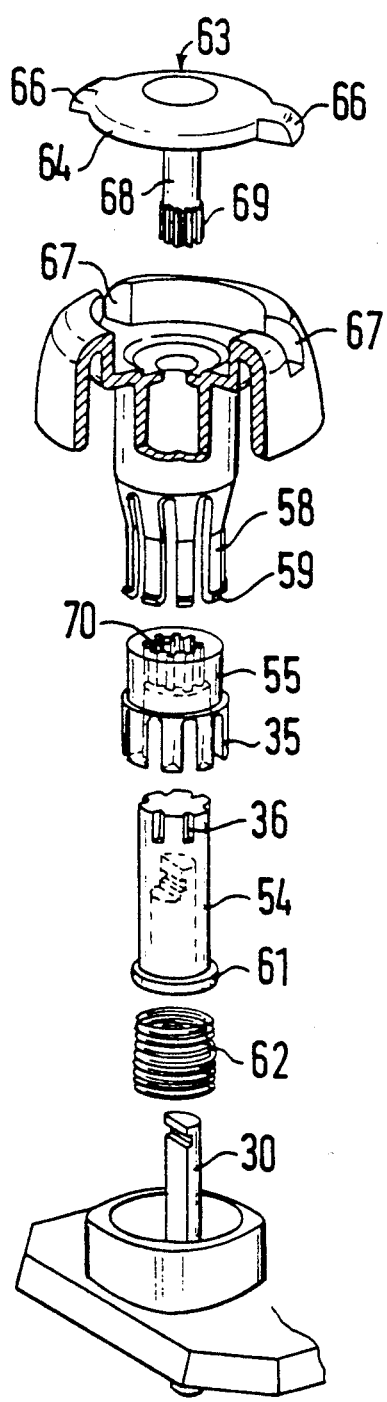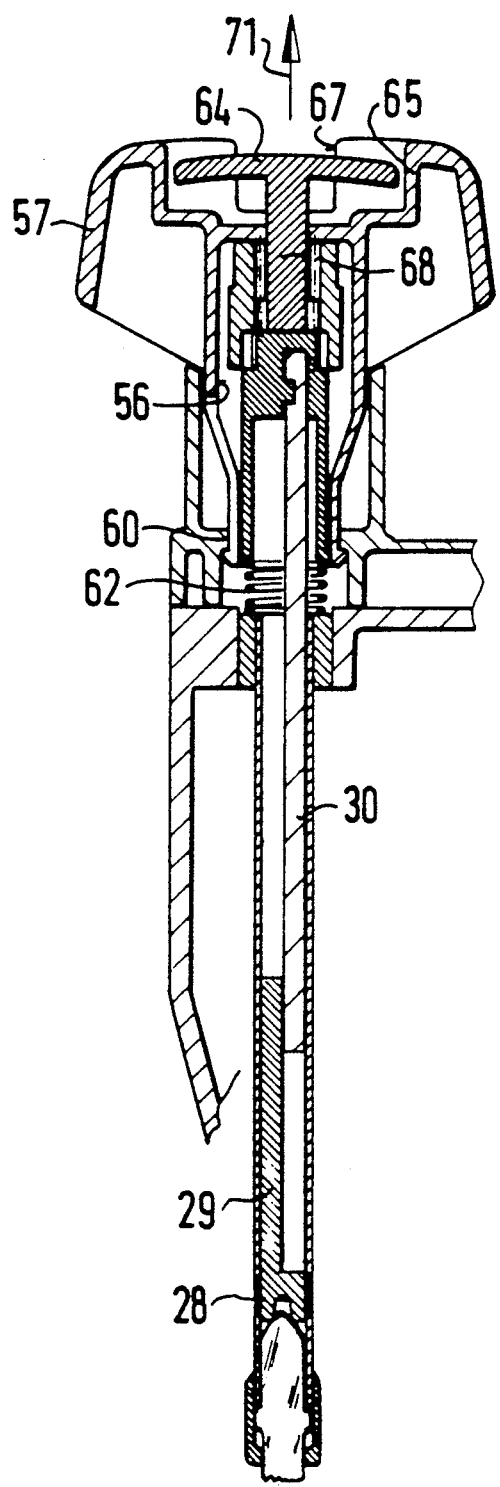

JIGSAW

BACKGROUND OF THE INVENTION

This invention relates to a jigsaw, and, more particularly, to a jigsaw including a blade retention system which permits the blade of the saw to be changed without the use of any tool external to the structure of the jigsaw itself.

In known jigsaw structures, the blade is fixed to the reciprocating drive shaft either by means of fixing screws that engage lateral surfaces of the blade to clamp the blade in position as shown, for example, in U.S.-A-3665983, or by means of a combined bayonet and fixing screw system, as shown in G.B.-A-1173172, in which the blade is provided with bayonet lugs which are held, in use, in corresponding retention grooves provided in an end cap of the drive shaft by a screw which engages the end of the blade.

Both of these systems have the disadvantage of requiring the use of an external tool (a screwdriver) in order to change the blade. Not only is this inconvenient, but also there is the danger that an inexperienced or careless operator may either damage a retaining screw in the process of changing a blade, or may inadequately tighten a fixing screw with the result that the blade may inadvertently be released from the drive shaft in use.

SUMMARY OF THE INVENTION

It is an object of the present invention to provide a jigsaw with a blade retention system which permits the saw blade to be changed without use of any separate extra tool.

This object and others is attained in a jigsaw a body having a bayonet fitting at the end thereof for receiving a blade having bayonet lugs, and locking means for engaging the blade to maintain the lugs in retention grooves of the bayonet fitting during use of the jigsaw. The locking means is movable to a release position in which the bayonet lugs can be moved out of the retention grooves to permit removal of the blade and insertion of a fresh blade according to the present invention the locking means is movable to its release position by a release device without using a tool separate from the jigsaw itself.

Accordingly, the disadvantage of the prior art, namely that a screwdriver is needed to release the retention screw or screws is avoided.

Preferably the locking means is movable to its release position by the release device incorporated within the jigsaw and permanently connected to the locking means. With such an arrangement, damage to the locking means caused by partial or incorrect engagement of the release device is avoided. Further, the release device preferably incorporates a manually graspable release member for operating the release device, the release member being arranged so that it does not move during normal reciprocation of the drive shaft.

In one particularly preferred embodiment of the invention the locking means is a screw movable axially of the drive shaft in a manner similar to the arrangement of the prior art shown in G.B.-A-1173172. In this case, the release device preferably comprises a screw rotating member extending axially through the drive shaft, the screw rotating member being permanently engaged with the screw in a manner which permits relative sliding movement between the screw and the screw rotating member, but prevents relative rotation between the screw and the screw rotating member. In this case, a manually graspable release member is connected to the screw rotating member for rotating the screw rotating member, and with it the screw. Preferably, a torque limiting device is interposed between the manually graspable release member and the screw rotating member to limit the torque which can be applied to the screw in the direction which moves the screw towards the blade. In this manner, damage caused by over-tightening of the screw is avoided. Preferably, the torque limiting device or torque limiter does not limit the torque which can be applied by the manually graspable release member in the direction tending to move the screw away from the blade.

In an alternative embodiment of the invention the locking means comprises a spring which biases the blade outwardly of the drive shaft to maintain the bayonet lugs in the retention groves. Preferably, a locking member is interposed between the spring and the blade and the release device comprises a tension member connected to the locking member and to a manually operable tensioning device, whereby the locking member may be moved to compress the spring and permit removal of the blade.

A particularly preferred embodiment of the invention is obtained if the locking member permits limited movement of the blade inwardly of the drive shaft against the bias of the spring during extreme operating conditions, as for example if the jigsaw is used with the bottom of the blade impacting a hard surface. With such an arrangement, impact loading on the drive shaft and the remainder of the mechanism of the jigsaw is significantly reduced.

Preferably, the locking member prevents relative rotation of the blade relative to the drive shaft except when the locking member is raised to the release position.

DETAILED DESCRIPTION OF THE DRAWING

The invention will be better understood from the following description of two embodiments thereof, given by way of example only, reference being had to the accompanying drawings wherein:

FIG. 1 is a partly broken away perspective view of a first embodiment of the invention;

FIG. 1A is an exploded perspective view showing a method of attaching a tension member to a cam nut, suitable for use in the embodiment of FIG. 1;

FIG. 7 is an exploded view of a modification of the embodiment of FIG. 5; and

FIG. 8 is a view partly in section, of the modification shown in FIG. 7, in its normal use configuration.

DETAILED DESCRIPTION OF THE INVENTION

Figure 2:
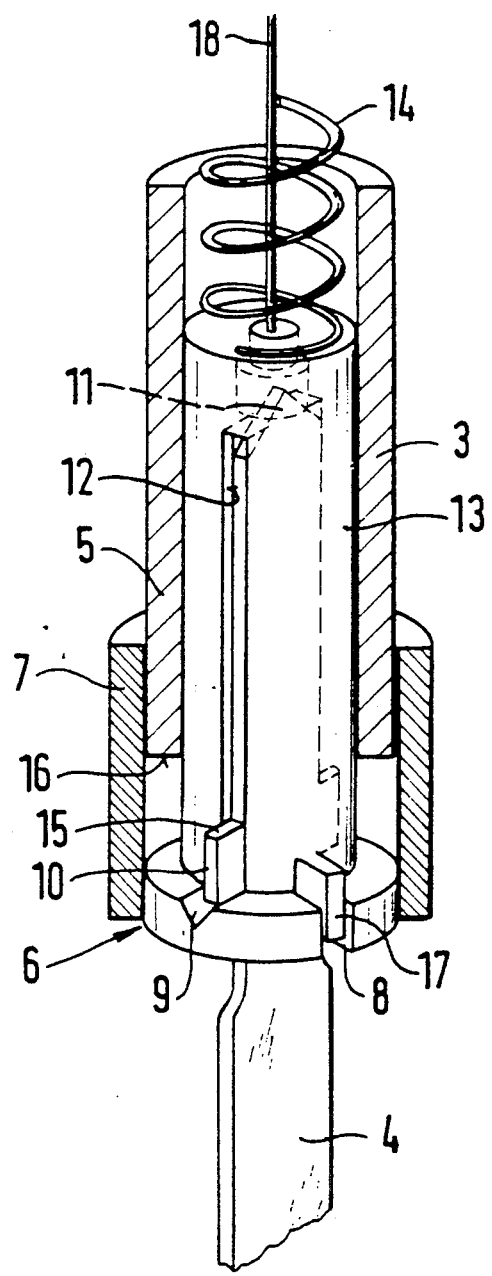
FIG. 2 is a view on a larger scale of a portion of the embodiment of FIG. 1.

Referring firstly to FIGS. 1 and 2 there is shown a partly broken away view of a jigsaw 1 comprising a body 2 and a drive shaft 3 which in use is axially reciprocated in a conventional manner for a jigsaw. In use, a blade 4 is connected to the exposed end 5 of the drive shaft by means of a bayonet fitting 6.

The bayonet fitting comprises an end cap 7 secured to the main portion of the drive shaft 3 and defining a pair of diametrically opposed entry slots 8 and a pair of diametrically opposed retention grooves 9, the retention grooves 9 being circumferentially off-set by 90° from the entry slots 8. The structure of the end cap 7 is substantially as described in G.B.-A-1173172.

In the normal use configuration of the jigsaw, diametrically opposed bayonet lugs 10 provided on the blade 4 are seated within the retention grooves 9 whereby movement of the drive shaft upwardly as viewed in FIGS. 1 and 2 is transmitted to the blade to effect an upward cutting stroke of the blade.

Referring particularly to FIG. 2, the portion of the blade 4 from just below the bayonet lugs 10 to the upper terminal end 11 of the blade is received in a slot 12 which is formed in a locking member 13 and is open at the bottom of the locking member. The locking member is biased downwardly as viewed in FIG. 2 by a compression spring 14 and engages the upper end 11 of the blade to apply the force of the spring to the blade. Accordingly, the blade is biased downwardly as viewed in FIG. 2 by the spring 14, and this is sufficient to retain the lugs 10 within the retention grooves 9 during normal operation of the saw.

If, however, the saw is subject to extreme operating conditions in which large upwardly directed axial impact forces are applied to the blade 4, the blade can move upwardly to a limited extent from the position illustrated in FIG. 2 against the bias of the spring 14. In moving upwardly, the blade 4 will lift the locking member 13 and accordingly compress the spring 14. As soon as the upwardly directed axial force is removed from the blade the spring 14 will return the locking member 13 to the position illustrated in FIG. 2, thereby returning the lugs 10 to the groves 9. Upwardly axial movement of the blade under such circumstances is limited by the engagement of the upper surfaces 15 of the lugs 10 with a shoulder 16 provided on the drive shaft.

The locking member 13 is provided with a pair of outwardly extending lugs 17 which, under normal operating conditions, are located within entry slots 8 in order to prevent rotation of the locking member 13 within the drive shaft 3. The axial overlap between the lugs 17 and the entry slots 8 is greater than the normal distance between the upper surfaces 15 of the lugs 10 and the shoulder 16, whereby even with the upper surfaces 15 in engagement with the shoulder 16 the lugs 17 are still in part located within the entry slots 8. Accordingly, even though limited axial movement of the blade 4 is permitted under extreme operating conditions, rotation of the blade 4 relative to the drive shaft is prevented by virtue of the engagement of the lugs 17 in the entry slots 8.

In order to release the blade 4 the locking member 13 is raised from the position illustrated in FIG. 2 to that of FIG. 1 by a release device (18-24). Therefore tension is applied to a tension member 18, for example a wire or bowden cable connected to the locking member. Raising the locking member 13 in this manner compresses the spring 14 and releases the blade 4 from the bias of the spring. When the locking member 13 has been raised sufficiently to release the lugs 17 from the entry slots 8 the blade 4 may be manually grasped and rotated through 90° to rotate the locking member 13 to a position in which the bayonet lugs 10 are aligned with the entry slots 8. The blade may then be manually removed and a fresh blade inserted. After the fresh blade has been inserted it is manually rotated through 90° and tension is released from the tension member 18 to re-apply the bias spring 14 to the blade in order to retain the bayonet lugs 10 of the new blade within the retention grooves 9.

Tension may be applied to the tensioning member 18 by any suitable means. In the case of the embodiment of FIG. 1, the upper end of the tension member 18 is secured to a cam nut 19 which runs on a cam screw 20 secured to the upper end of the drive shaft 3. The cam nut 19 includes a pair of diametrically opposed ribs 21 which run in slots 22 provided in a nut rotating member 23. The central portion of the member 23 has been broken away in FIG. 1 to illustrate the cam nut 19 and cam screw 20, but it will be appreciated that the cam nut will normally be wholly contained within the member 23.

The member 23 is fixed within the body of the jigsaw against reciprocating movement, and accordingly during normal use of the jigsaw reciprocating movement of the drive shaft will cause the cam nut 19 to reciprocate within the member 23 with the ribs 21 running in the groves 22. When it is desired to apply a tension to the tension member 18 the nut rotating member 23 is rotated by any suitable means to cause corresponding rotation of the cam nut 21. This will in turn cause the cam nut to run up the cam screw 20 to apply tension to the member 18 in the desired manner. It will be noted that with this arrangement upward movement of the cam nut 19 relative to the drive shaft can be obtained regardless of the position of the drive shaft within its operating cycle.

The member 23 may be rotated by any suitable means, for example by means of a manually operable lever 24 pivotally mounted on the body and coupled to the member 23 by way of meshing bevel gears 25.

FIG. 1A illustrates one possible arrangement for securing the tension member 18 to the cam nut 19. In this arrangement the tension member 18 is in the form of a wire, and the end region 18A of the wire is bent over and secured in place to produce a head 40 at the upper end of the tension member. The tension member 18 extends through a pair of slotted plates 41,42 which, in use, are located in a recess 43 formed in the top of the cam nut 19. The slots in the plates 41 closely receive the tension member 18 and are orientated at 90° to each other so that the head 40 is unable to pass through the passage defined by the plates.

Figure 3:
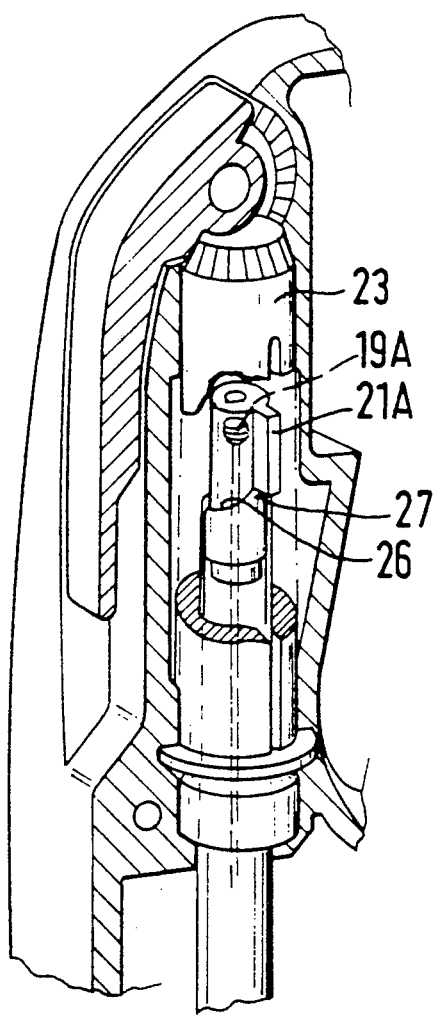
FIG. 3 is a partially cutaway perspective view illustrating a modification of the embodiment of FIG. 1.

In the modification of the FIG. 1 arrangement illustrated in FIG. 3, a cam profile 26 is provided on the upper end of the drive shaft and the lower edges 27 of the cam nut ribs 21A run on the cam surface 26 to produce the desired relative axial movement of the cam nut 19A relative to the drive shaft as the member 23 is rotated.

Figure 4:
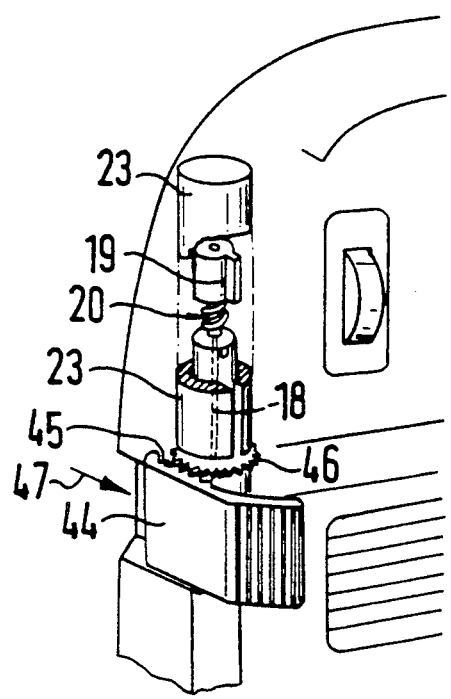
FIG. 4 is a partially cutaway perspective view illustrating an alternative modification of the embodiment of FIG. 1.

In the modification shown in FIG. 4 the cam nut 19, cam screw 20 and rotating member 23 are similar to the arrangement of FIG. 1. However, rotation of the member 23 is effected by slide member 44 which is formed with a rack 45 which is in meshing engagement with pinion teeth 46 formed on the member 23. Accordingly, sliding movement of the slide member 44 in the direction of the arrow 47 causes rotation of the member 23 to rotate the cam nut and apply tension to the member 18 as described above.

Figure 5:
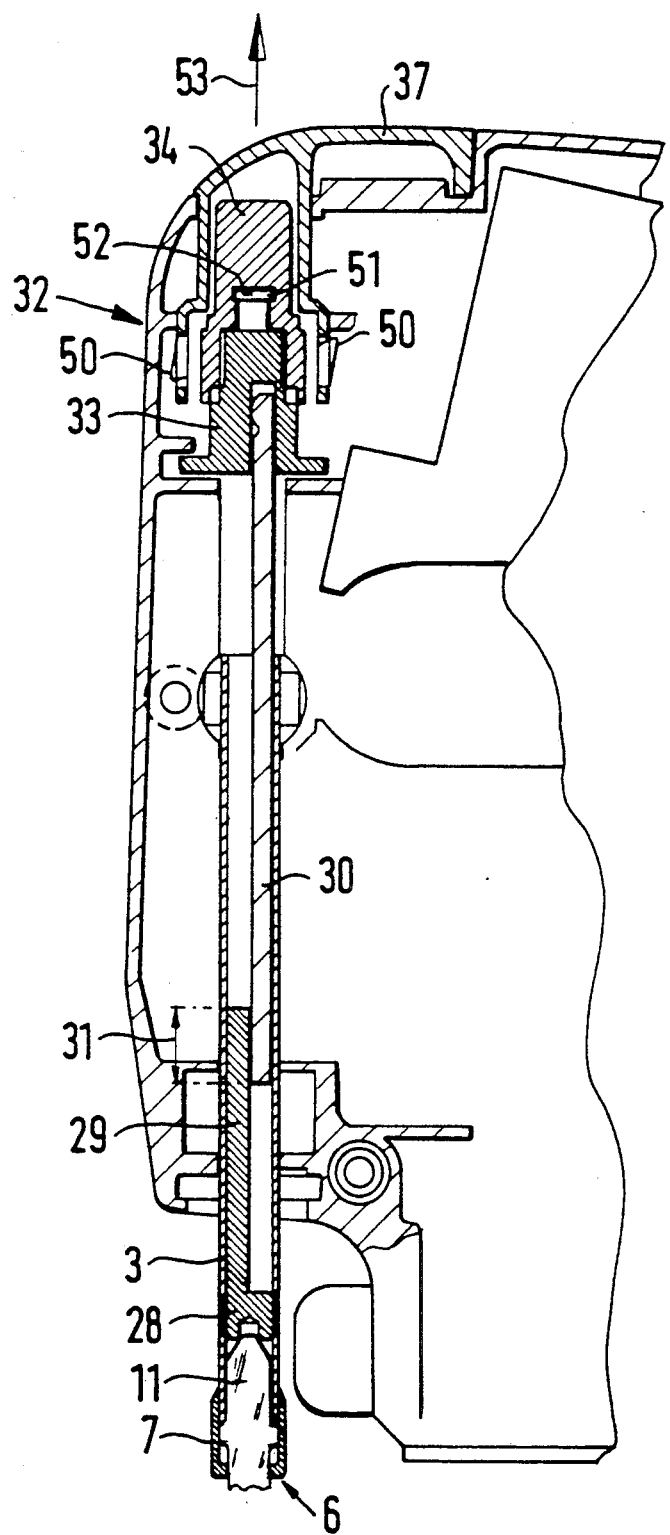
FIG. 5 is a partly broken away cross sectional view showing a second embodiment of the invention.
Figure 6:
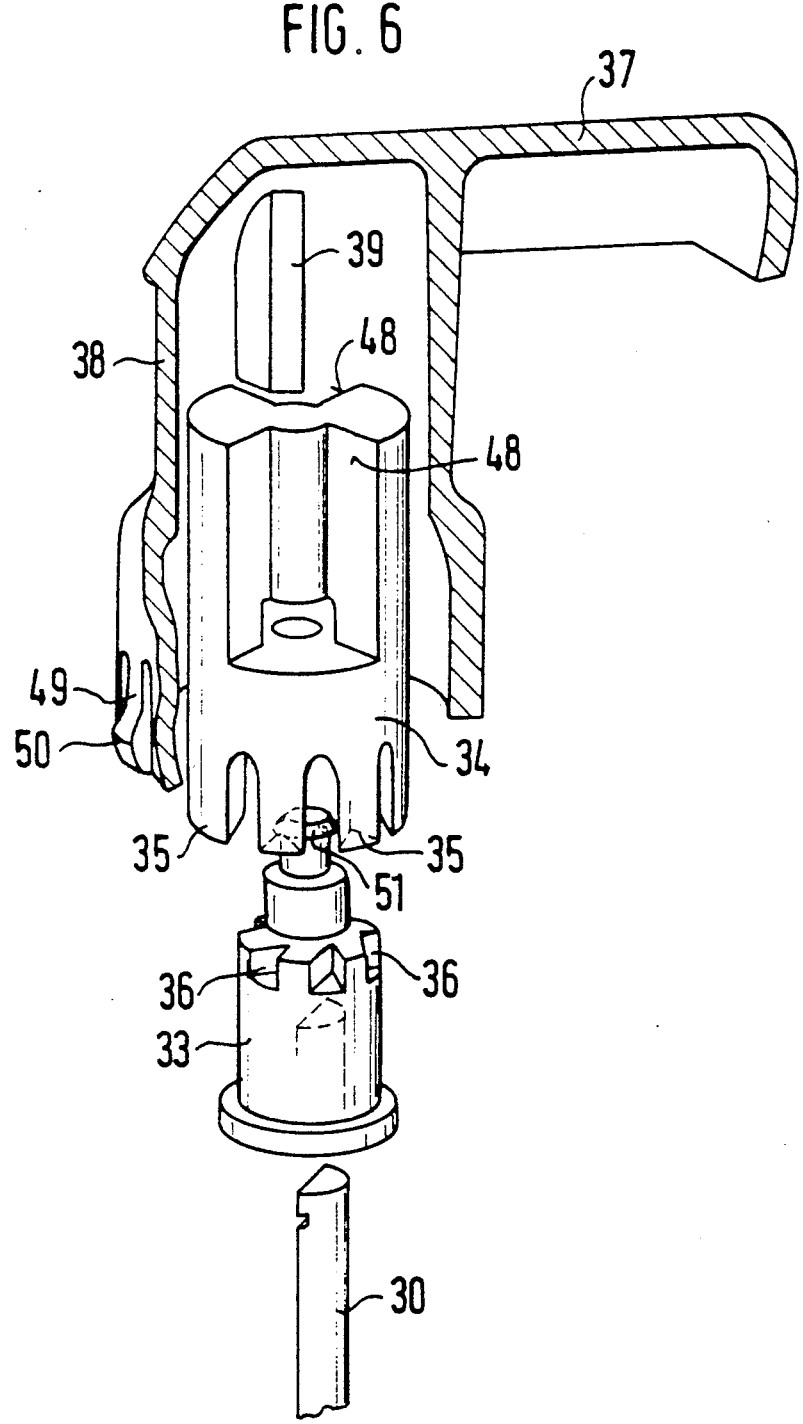
FIG. 6 is an exploded view of components of the embodiment of FIG. 5.

Referring now to FIGS. 5 and 6, there is illustrated an alternative embodiment of the invention. In this embodiment the drive shaft 3 is provided with an end cap 7 substantially identical to that illustrated in FIG. 2 whereby a bayonet fitting 6 is provided for receiving suitable blades. Again, the bayonet fitting arrangement is similar to that illustrated in G.B.-A-1173172. In this embodiment, however, the bayonet lugs of the blade are normally retained within retention grooves of the end cap 7 by means of a screw 28 in screw-threaded engagement with the interior surface of the hollow drive shaft 3. The screw 28 is arranged to engage the upper terminal end 11 of a blade in order to apply a downward force on the blade to retain the blade bayonet lugs in the retention groves of the end cap.

The screw 28 is operated by a release device (29-37) and provided with an extension 29 of D-shaped cross-section. In all operating positions of the shaft 3 the extension 29 axially overlaps a screw rotating member 30 also having a substantially D-shaped cross section. Accordingly, in the region of axial overlap 31 the extension 29 and rotating member 30 have confronting and mutually sliding flat surfaces.

The screw rotating member 30 extends upwardly through the drive shaft 3 and terminates in a suitable rotating mechanism 32. During normal use of the saw the mechanism 32 maintains the shaft 30 at a fixed position relative to the casing of the jigsaw, and axial reciprocation of the drive shaft and screw 28 is accommodated by axial sliding movement of the confronting surfaces of the extension 29 and screw rotating member 30 in the zone of axial overlap 31. When it is desired to unscrew the screw 28 with a view to releasing the retained blade, the screw rotating member 30 is rotated by the rotating mechanism 32 and this rotation is transmitted in the zone of overlap 31 to the screw extension 29 to effect rotation of the screw. After a new blade has been inserted, the member 30 is rotated in the opposite direction to tighten the screw 28.

Preferably, the rotating mechanism 32 incorporates means limiting the torque which can be applied to the member 30 in a direction tending to move the screw 28 downwardly as illustrated in FIG. 5, whereby over-tightening of the screw is prevented.

The mechanism 32, which provides torque limiting in the tightening direction, is illustrated in FIG. 6. The upper end of the screw rotating member 30 is secured to a ratchet member 33 which, in use, is driven by a pawl bush 34 having depending fingers 35 which engage in peripheral slots 36 in the ratchet member 33. The pawl bush 34 is molded from a suitable plastics material so that the fingers 35 are flexible and are able to flex over the teeth formed between the slots 36 of the ratchet at a defined torque. Fingers 31 and slots 36 form a torque limiter 35/36. Preferably, the profile of the fingers and ratchet teeth is so chosen that the snap-over torque in the direction tending to tighten the screw 28 is limited to a preferred value, for example 1 Nm, but snap-over in the reverse direction is substantially prevented, whereby a higher level of torque can be applied by the pawl bush in order to release the screw 28.

The pawl bush 34 may be driven by any suitable means, for example by means of a release member formed as a drive lever 37 which is permanently secured to the housing of the jigsaw and incorporates a tubular body 38 which surrounds the pawl bush 34. The inside of the body 38 is provided with a pair of ribs 39 (only one of which is visible in the drawings) which are received in over-size slots 48 in the pawl bush whereby a rotary lost-motion connection is formed between the lever 37 and the pawl bush 34.

The tubular body incorporates fingers 49 having bulges 50 on the outer surface thereof for cooperation with suitable means provided on the jigsaw body to maintain the lever in the parked position illustrated in FIG. 5 during normal use of the jigsaw. In this position the outer surface of the lever 37 is flush with the adjacent surfaces of the jigsaw body. The lever can, however, be grasped and pulled in the direction of the arrow 53 to snap the bulges 50 over the cooperating means on the body and place the lever in a use position in which it can be rotated to turn the pawl bush 34 and ratchet member 33 to release the blade as described above. After a new blade has been inserted the screw 28 is tightened by rotation of the lever 37 until the pawl bush 34 begins to snap over the ratchet teeth. Rotation of the lever 37 is continued until the lever is approximately aligned with the body, whereupon the lost motion provided between the ribs 39 and slots 48 is used to facilitate final alignment of the lever relative to the body before the lever is pushed downwardly to snap the bulges 50 over the cooperating means on the body to return the lever to the parked position illustrated in FIG. 5. This arrangement ensures that the torque limiter 32 is unstressed when the lever is in the parked position In order to maintain the pawl bush 34 in the correct operating position relative to the ratchet member 33, a snap together connection may be formed by a head 51 on the ratchet member and a groove 52 in the pawl bush. Once the head 51 has been forced into the groove 52 the ratchet and pawl will be maintained in the correct relative axial positions, but will be able to rotate relative to each other as necessary for torque limiting.

Referring now to FIGS. 7 and 8, an alternative arrangement for applying the desired torque to the screw rotating member 30 is shown. In this case, the upper end of the screw rotating member 30 is fast with a ratchet member 54 which, in use, is driven by a pawl bush 55. The pawl bush 55 includes extending fingers 35 which cooperate with peripheral slots 36 in the ratchet member 54 substantially as described above with reference to FIG. 6 whereby the pawl and ratchet mechanism is able to transmit only a limited torque to the screw rotating member in the direction tending to tighten the screw 28, but does not limit the torque which can be applied to the screw rotating member 30 in the opposite direction.

As shown in FIG. 8, the ratchet member 54 and pawl bush 55 are normally housed within a downwardly open chamber 56 defined within a manually graspable knob 57. The lower portion of the chamber 56 is defined by a plurality of spring fingers 58 each having an outwardly directed tooth 59 at the lower extremity thereof. In the normal use configuration as shown in FIG. 8 the teeth 59 engage the underside of an inwardly directed flange 60 provided on the jigsaw body whereby the knob is retained on the jigsaw body but is freely rotatable relative to the body. An outwardly directed flange 61 at the lower end of the ratchet member 54 is a close fit within the fingers 58 at the level of the teeth 59, whereby radial inward movement of the fingers 58 is prevented, and accordingly the knob is held captive on the jigsaw body. The ratchet member 54 is biased upwardly into the illustrated position by a spring 62.

An actuating member 63 is located within the knob 57 in such a manner as to prevent relative rotation between the actuating member and the knob. To achieve this the illustrated embodiment the actuating member includes a head 64 which is located within a recess 65 in the knob and is formed with a pair of outwardly directed lugs 66. The lugs 66 are located within slots 67 formed within the knob whereby rotation of the actuating member relative to the knob is prevented. The actuating member 63 also includes a shaft 68 which extends downwardly from the head 64 through the base of the recess 65 and into the chamber 56. The lower end of the shaft 68 is formed with splines 69 for cooperation with mating splines 70 provided on the pawl bush 55.

In the normal use configuration illustrated in FIG. 8 the splines 69 are located below the level of the splines 70 in the pawl bush so that there is no driving interengagement between the two sets of splines. Accordingly, rotation of the knob 57 relative to the jigsaw body will cause corresponding rotation of the actuating member 63, but the actuating member will not produce any rotation of the pawl bush 55. When i is desired to rotate the pawl bush 55 to rotate the screw rotating member 30 to release a blade, the lugs 66 are grasped and the actuating member 63 is moved in the direction of the arrow 71 to engage the splines 69 with the splines 70. The degree of movement permitted for the actuating member 63 is less than that necessary to disengage the lugs 66 form the slots 67, and accordingly once the splines 69,70 have been interengaged the knob 57 may be grasped and rotated to rotate the actuating member 63 and, via the interengaging splines, the pawl bush 55. After a new blade has been inserted, the screw 28 may be re-tightened by reverse rotation of the knob 57, and the pawl bush 55 and ratchet member 54 will limit the tightening torque which can be applied, as described above.

If for any reason it is found desirable to remove the knob 57 the actuating member 63 may be depressed (moved in the direction opposite to the arrow 71) to depress the ratchet member 54 and screw rotating member 30 against the bias of the spring 62. As soon as the flange 61 clears the lower edge of the fingers 58 the knob 57 may be pulled upwardly and the fingers 58 can move radially inwardly to allow the teeth 59 to clear the flange 60, whereupon the knob 57 complete with actuating member 63 and pawl bush 55 can be withdrawn from the jigsaw. The knob assembly can be replaced simply by pushing it into position whereby the lower extremity of the fingers 58 will engage the upper surface of the flange 61 to depress the ratchet member 54 sufficiently to enable the teeth 59 to pass through the opening defined by the flange 60, whereupon the fingers 58 will spring outwardly to engage the teeth 59 beneath the flange and to permit the ratchet member 54 to re-assume the position illustrated in FIG. 8.

With the exception of the screw rotating member 30 and the spring 62, the various components of the rotating mechanism as described above, and in particular the pawl members and ratchet members, are preferably produced from plastics material by injection molding.

Whilst the screw extension 29 and screw rotating member 30 have been illustrated above as being of D-shaped cross-section, it will be appreciated that these components may be of any complementary cross-section which provides for relative axial sliding movement, but prevents rotation of one component relative to the other. Further, it will be appreciated that the confronting sliding surfaces of the extension 29 and screw rotating member 30 are preferably treated to render them wear resistant, for example by carbonitriding.

It will be understood that each of the elements described above, or two or more together, may also find a useful application in other types of structures differing from the types described above.

While the invention has been illustrated and described as embodied in a jigsaw, it is not intended to be limited to the details shown, since various modifications and structural changes may be made without departing in any way form the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. In a jigsaw comprising a body (2), a drive shaft (3) mounted axially reciprocatable in the body (2) and a saw blade (4) having a plurality of bayonet lugs (10) at one end thereof, said drive shaft (3) having a bayonet fitting (6) at one end thereof for receiving the saw blade (4), the bayonet fitting (6) having a plurality of retention grooves (9) in which the bayonet lugs (10) of the saw blade (4) are engagable and said drive shaft (3) being provided with locking means (13, 14 or 28) by which the saw blade (4) can be held to maintain the bayonet lugs (10) in the retention grooves (9) of the bayonet fitting during operation of the jigsaw, the locking means (13, 14 or 28) being movable to a release position in which the bayonet lugs (10) can be moved out of the retention grooves (9) to permit removal and replacement of the saw blade (4), the improvement comprising a release device (18–24 or 29–37) permanently connected to the locking means (13, 14 or 28), incorporated within the body (2) and having a manually graspable release member (24 or 37), said release member not being movable during normal reciprocation of the drive shaft (3) but otherwise being movable manually to operate the release device to move the locking means to the release position without use of a tool separate from the jigsaw.

2. The improvement as defined in claim 2, wherein the drive shaft (3) is hollow and the locking means comprises a screw (28) movable axially on a threaded interior surface of the drive shaft (3) to engage one end (11) of the saw blade and the release device comprises a screw rotating member (30) extending axially through the hollow drive shaft (3), the screw rotating member being permanently engaged (31) with the screw (28) and structured so as to permit relative sliding movement between the screw and the screw rotating member, but to prevent relative rotation between the screw (28) and the screw rotating member (30).

3. The improvement as defined in claim 2, further comprising a torque limiting device (35/36), and wherein the manually graspable release member (37) is coupled to the screw rotating member (3) by said torque limiting device (35/36), said torque limiting device being structured to limit a torque applied to the screw when the screw is rotated by rotation of the screw rotating member in a rotation direction causing the screw to move toward the saw blade.

4. The improvement as defined in claim 2, wherein the release device (29 to 37) comprises a pawl bush (34) connected with the manually graspable release member (37) and a ratchet member (33) nonrotatably attached to the screw rotating member (3) and engagable with the pawl bush (34), and wherein the manually graspable release member (37) has a plurality of interior ribs (39) and the pawl bush (34) is provided with a corresponding plurality of oversize slots (48) in which the interior ribs (39) are engaged so that the ribs (39) and the oversize slots (48) together comprise a lost motion connection (39,48) permitting a limited rotation of the release member (37) without rotation of the screw rotating member.

5. The improvement as defined in claim 4, wherein the oversize slots and the ribs of the lost motion connection are structured so that the extent of the limited rotation of the release member without rotation of the screw rotating member is at least 60°.

6. The improvement as defined in claim 4, wherein the oversize slots and the ribs of the lost motion connection are structured so that the extent of the limited rotation of the release member without rotation of the screw rotating member is approximately 90° C.

7. The improvement as defined in claim 4, wherein the ratchet member (33) is provided with a plurality of peripheral slots (36) in the vicinity of the pawl push (36) and pawl bush (34) is provided with a plurality of fingers (35) engagable in the peripheral slots (36) of the ratchet member (33), and the slots (36) and the fingers (35) are shaped so that the ratchet member (33) and the pawl bush (36) provide a torque limiting device limiting a torque necessary for tightening the screw (28).

* * * * *